Feb. 13, 1940.  T. B. CHACE  2,190,310
METHOD OF CLADDING METAL
Filed Jan. 2, 1937   4 Sheets-Sheet 1
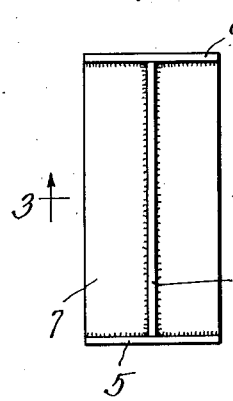
Fig. 2.
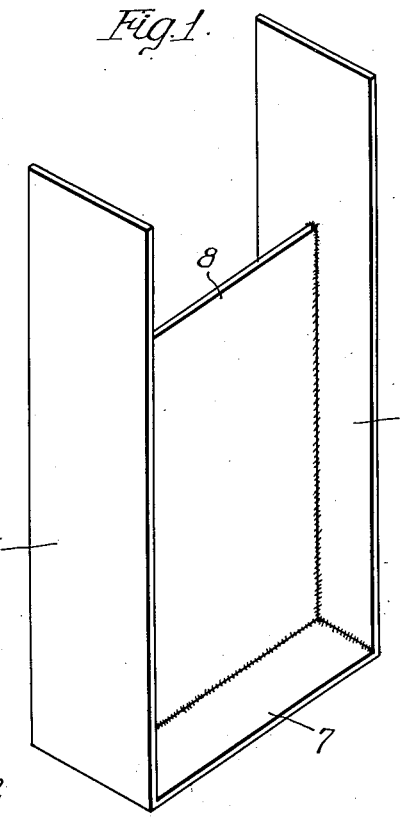
Fig. 1.
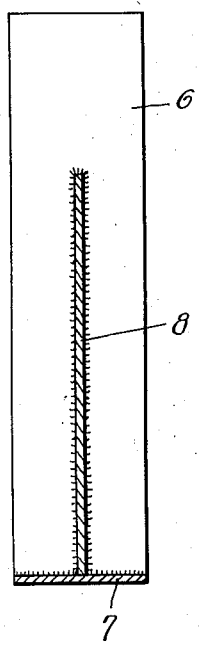
Fig. 3.
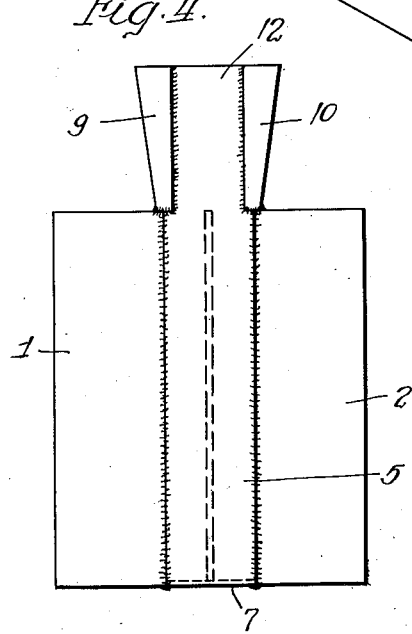
Fig. 4.
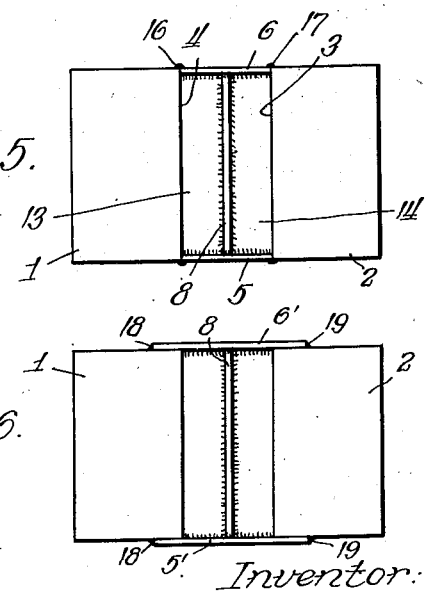
Fig. 5.
Fig. 6.
Inventor:
Thomas B. Chace
By Brown Jackson Boettcher Dienner
Attys.

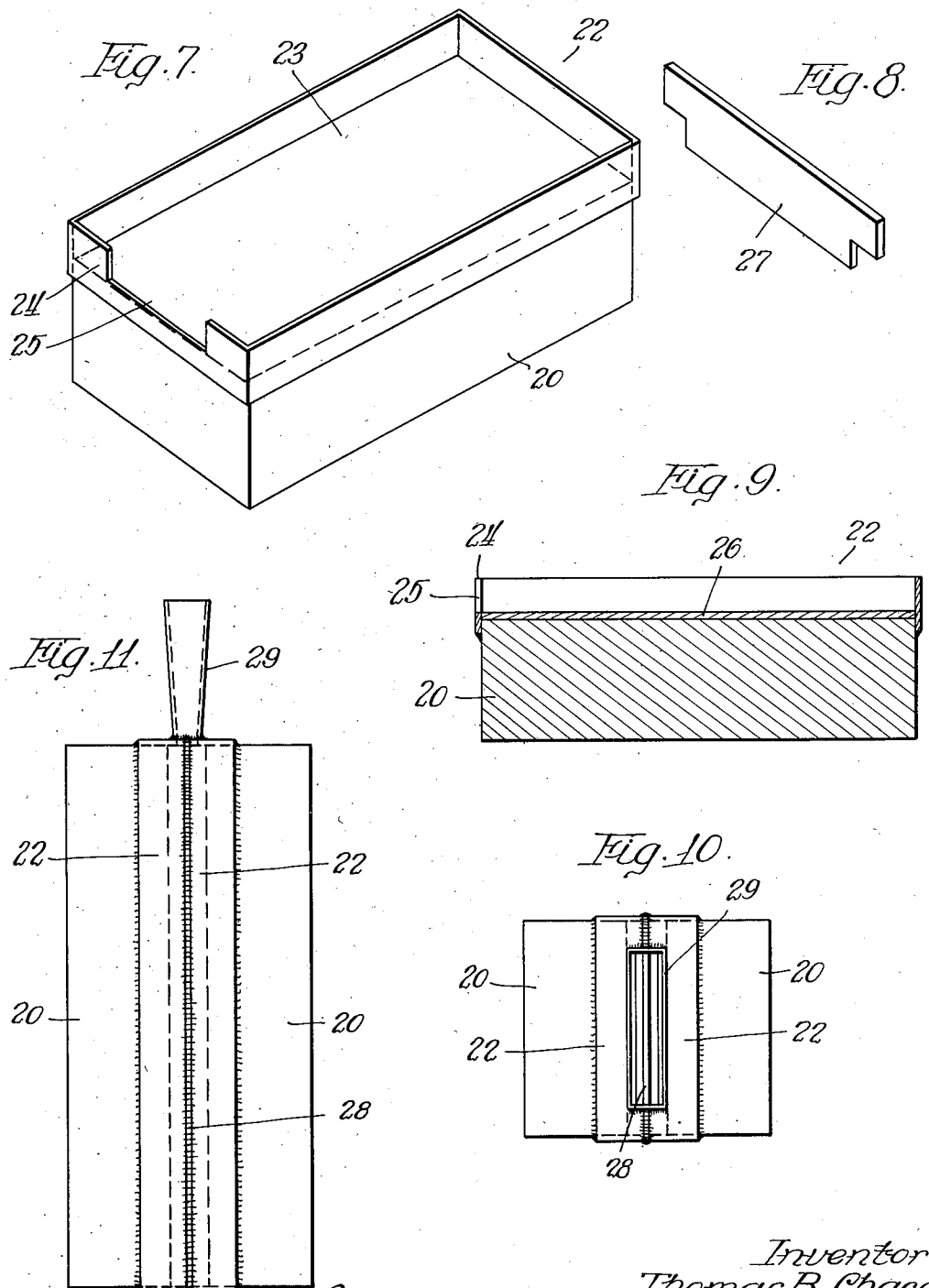

Feb. 13, 1940. T. B. CHACE 2,190,310
METHOD OF CLADDING METAL
Filed Jan. 2, 1937 4 Sheets-Sheet 3
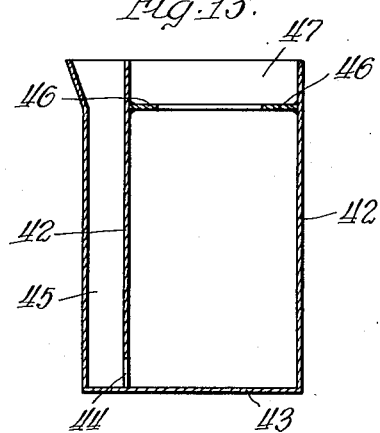
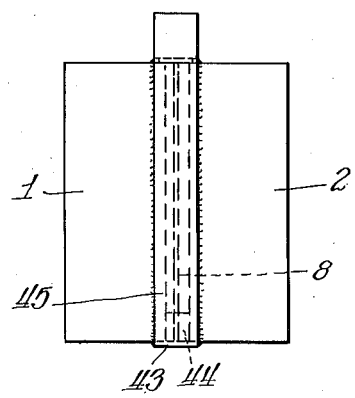
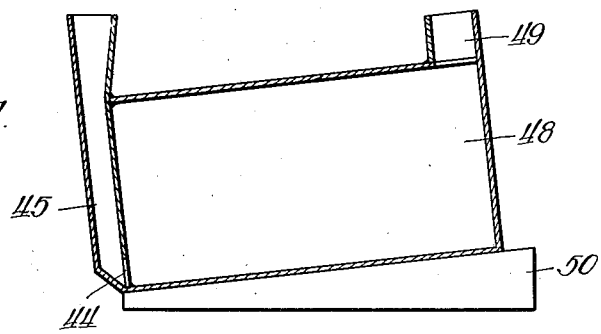
Inventor:
Thomas B. Chace.

Feb. 13, 1940.　　　T. B. CHACE　　　2,190,310
METHOD OF CLADDING METAL
Filed Jan. 2, 1937　　　4 Sheets-Sheet 4

Inventor:
Thomas B. Chace
By Brown Jackson Boettcher & Dienner
Attys.

Patented Feb. 13, 1940

2,190,310

UNITED STATES PATENT OFFICE

2,190,310

METHOD OF CLADDING METAL

Thomas B. Chace, Winnetka, Ill., assignor, by direct and mesne assignments, to Clad Metals Industries, Inc., Chicago, Ill., a corporation of Illinois Application January 2, 1937, Serial No. 118,812

13 Claims. (Cl. 22—204)

The present invention relates to methods of and means for cladding metal. While the invention is particularly applicable to the production of what is termed in the art as "copper clad steel" it is to be noted that the invention may be applied to the joining of other metals than copper or its alloys, and steel or other forms of iron.

Also it is to be noted that while the preferred combination of metals to produce so-called "copper clad steel" is a silicon bronze for the facing and open hearth steel for the backing, it is to be understood that various alloys high in copper may be utilized as the facing, and various forms of steel or iron for the backing. Hence, the terms cuprous metal and steel are employed as designating, respectively, a metal whose chief characteristics are similar to those of copper, and a metal whose characteristics are similar to those of iron.

One of the objects of the present invention is to produce slabs of copper clad steel for hot rolling with the cuprous metal surfaces covered to avoid oxidation.

I have found that during hot rolling of a composite copper-clad steel slab into sheet form, the surface of the cuprous metal tends to oxidize. This oxide is difficult to remove and tends to interfere with the production of a smooth surface, and I propose to produce a slab with the cuprous metal surface covered during rolling. The cuprous metal surfaces can be covered by placing two composite slabs face to face and welding the edges together either directly or by a strip or the like, as disclosed in my copending application, Serial No. 106,869, filed October 21, 1936, but this requires a double heating. I propose, according to the present invention, to produce a slab or slabs with the cuprous metal face covered, and which can be hot rolled from the original heat of bonding the two metals together. I disclose herein two ways in which this may be accomplished. First, a double composite slab with the cuprous metal surfaces facing each other is provided according to the present invention. Second, a single composite slab with the cuprous metal surface of the slab suitably covered with a thin sheet may be provided according to the present invention.

An important feature of the present invention is the manner of bringing the cuprous metal facing into bonding relation to the steel slabs. The steel slab may be prepared by sand blasting and fluxing as by baking a flux such as six parts of borax and one part of boric acid upon the surface, or by previously bonding an intermediate or bonding layer of metal to the surface. The final application of the cuprous metal facing is effected by disposing the block on its side or end so that the free liquid surface of the copper when it is melted is an end or edge of the facing and not the face which forms the finished face of the sheet. Instead of baking flux upon the surface, the entire mould may be filled with flux or with metal and flux, which is then melted as the slab is brought to heat.

In forming a double composite slab, the preferred method consists in spacing the two steel slabs with their prepared faces toward each other a suitable distance, and then welding a strip about three sides, either between the margins of the slabs or overlapping the adjacent margins and disposing a separating plate midway between the two faces. The peripheral strip is extended above the upper side or end of the two steel slabs to form a spout or header. The copper for the facing may be introduced as a rolled bar, a cast slab, broken or scrap material in advance of melting, or the metal may be poured into the space in a molten condition. When the metal is poured in in molten condition it displaces the molten flux which adheres to the face of the slab or which fills the cavity of the mould.

In either event, the surfaces of the slabs are protected by molten flux which is displaced or floated to the top by the molten metal. The dividing plate is previously treated or is so constituted as to prevent bonding of the copper or the like metal thereto, and it serves merely to hold the two cuprous metal faces apart, so that they will not be welded or stuck together by the heat and rolling. It can be seen that half of the same structure will produce a single covered slab. In that event, the face of the slab and three edges are covered by a suitable cover plate, and the cuprous facing metal is introduced or poured in at the upper free edge.

Now in order to acquaint those skilled in the art with the manner of constructing and operating devices in accordance with my invention, and the practice of the process of my invention, I shall describe, in connection with the accompanying drawings, a specific embodiment of the invention and the use thereof.

In the drawings:

Figure 1 is an isometric view of a peripheral strip of dividing wall assembly to be employed in making a double composite ingot or slab.

Figure 2 is a top plan view of the same.

Figure 3 is a vertical sectional view taken on the line 3—3 of Figure 2.

Figure 4 is a side elevational view of a mold constructed of the fitting of Figures 1, 2 and 3 applied to two ingots.

Figure 5 is a top plan view of the construction shown in Figure 4.

Figure 6 is a similar top plan view of a modification of the construction shown in Figure 4.

Figure 7 is an isometric view of an open-faced mold for applying a layer of bonding metal to a slab preparatory to the making of a double composite ingot or slab, as disclosed in Figures 10 and 11.

Figure 8 is an isometric view of a scraper to be employed in connection with the mold of Figure 7.

Figure 9 is a vertical longitudinal section through the mold of Figure 7 after the application of a layer of bonding metal to the face of the slab.

Figure 10 is a top plan view.

Figure 11 is a side elevation of a mold for making a double composite slab or ingot.

Figure 12 is a side elevational view of a modification of the mold shown in Figure 4 for bottom pouring.

Figure 13 is a vertical longitudinal section through the mold of Figure 12.

Figure 14 is a vertical longitudinal section through a modified form of mold for bottom pouring.

Figure 17:
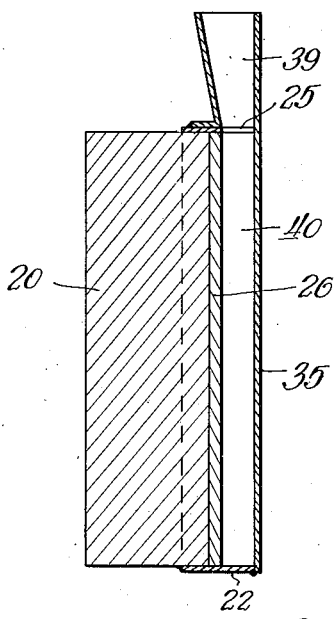
Figure 18:
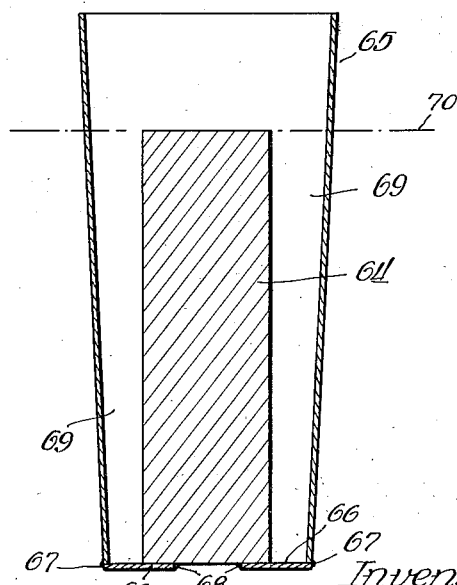

Figure 17 is a similar view of a modified from of mold for applying the facing layer of predetermined depth after a bonding layer has been applied as per the preliminary step shown in Figures 7 and 8; and Figure 18 is a vertical longitudinal section through a mold for applying a predetermined thickness of facing metal to the lateral surface of a block or ingot, of square, round, or polygonal section.

In the production of copper clad steel, such as sheets, strips, bars and the like, a composite ingot or slab of low carbon steel faced with a copper alloy such as a silicon-nickel-copper alloy to a thickness of approximately 10% to 20% of the entire ingot or slab is first produced. This ingot or slab is subjected to rolling to reduce the thickness of the section to the desired degree. The first passes are preferably made while the ingot or slab is still hot. The steel backing is preferably a low carbon steel.

The facing is preferably an alloy comprising any of the analyses disclosed in my copending applications, Serial No. 6,497, filed February 14, 1935, and Serial No. 64,280, filed February 17, 1936. A suitable facing alloy comprises 1½% nickel, 1½% silicon, and the remainder copper. The cuprous alloy of the above or other suitable analysis should have the necessary strength, bondability and working qualities to make it roll substantially like the steel backing. In other words, it is desirable that the general physical characteristics of the cuprous facing and particularly those relating to working, be the same as, or similar to, those of the ferrous backing. Obviously, other metals or alloys may be employed as a facing metal, if desired.

The method of my invention, while it is particularly applicable to the manufacture of composite ingots of steel and cuprous alloy, may nevertheless be applied to the facing of a steel backing with other metals or alloys.

Since the initial step of rolling is preferably hot rolling, following the operation of bonding the molten facing metal to the steel backing, the exposure of the cuprous alloy to the air may result in a certain amount of oxidation which is undesirable, particularly as the scale is a nuisance, and it may mar the surface, as it is difficult to remove from the surface.

It is known to roll composite slabs together with the finished surfaces or faces toward each other so as to protect them during rolling. In Figures 1 to 6, I have shown one method in which a double composite slab may be made for such rolling. Two steel slabs or ingots 1 and 2 have their faces 3 and 4 prepared as by sand blasting. They are preferably covered with flux later.

A generally U-shaped thin strip or bar of steel which may be made up as one piece or as three separate pieces welded together is disposed between the faces of the blocks 1 and 2, as shown in Figure 5. The strip comprises side members 5 and 6, and a bottom member 7. Between the side members 5 and 6 there is disposed a separating wall of steel 8, which is preferably of a character either as to composition or surface treatment such that the facing metal will not later bond thereto. The dividing wall 8 is welded preferably to the sides 5 and 6 and to the bottom 7. This wall 8 is of approximately the height of the slabs 1 and 2, as shown in dotted lines in Figure 4, but the side walls 5 and 6 extend above the tops of the blocks 1 and 2, as shown in Figure 4 and in conjunction with channel shaped plates 9 and 10 provide a hopper or spout 12 which extends a material distance above the tops of the blocks 1 and 2 for either pouring, if molten metal is introduced into the spaces 13 and 14, or to receive a charge of flux and facing metal in the event that the facing metal is melted in place between the blocks 1 and 2.

Instead of disposing the strips 5, 6 and 7 edgewise between the blocks 1 and 2, these strips 5, 6 and 7 may be made wider than the space between the faces 3 and 4, so as to overlap the margins as indicated at 5' and 6' in Figure 6. Thus, instead of welds, at the corners 16 and 17, shown in Figure 5, welds at 18 and 19 spaced away from the corners of the blocks 1 and 2 may be employed for attaching the strips 5' and 6' to the blocks 1 and 2. The mold made up as shown in Figure 4 or Figure 6 may be then filled with a charge of bonding metal in loose pieces, the weight of the charge being calculated to fill the spaces 13 and 14 above the level of the dividing wall 8 when melted down. This charge of metal is covered with a suitable flux, such as boric acid, and the mold is heated in a furnace to a temperature of approximately 2400° F., at which time the facing metal, in this case assumed to be 1½% nickel, 1½% silicon, and the remainder copper, is employed. It is necessary to bring the steel blocks to approximately 2400 F. to secure a satisfactory bond between the alloy and the steel. The molten metal displaces the molten flux and fills the spaces 3 and 4. Then, as soon as the assembly has cooled down to approximately 1600°, the assembly may be passed through the rolls for rolling to double thickness. The sprue or pouring spout indicated at 12 in Figure 4 may be cut off prior to rolling, or it may be removed later.

Alternatively, the mold may be preheated with a suitable charge of flux in the spaces 3 and 4. When the mold has been heated to approximately 2400° F. molten cuprous alloy or other facing metal may be poured into the mold, displacing the flux and filling the mold spaces 13 and 14 to a point above the level of the dividing wall 8. The facing metal is prevented from bonding to the wall 8 by a coating of oxide or by other treatment of the surface, or alternatively, the dividing wall 8 may be made of material which does not readily bond to the facing metal. Filling of the mould according to either procedure produces two copper faced steel slabs suitably held in position for rolling together, with the copper completely protected from atmosphere.

If desired, a layer of bonding metal may first be applied to the blocks before they are made up in a double mould as shown in Figures 7 to 11, inclusive. In this case, a block or slab of steel 20 is provided with the flange or rim 22 formed of relatively thin strips of steel bar welded around the periphery of the block 20 to provide a liquid tight basin or container. The welding face 23 forms the bottom of this liquid container. One wall, for example, the end wall 24, has a notch 25 cut therein.

The face 23 is cleaned as by sand blasting and covered with flux, and is then preheated to a welding temperature of approximately 2400° F., whereupon molten bonding metal to the depth determined by the notch 25 is poured upon the face 23, as indicated by the layer 26 in Figure 9.

The molten flux may optionally be scraped off, as by means of a scraper 27 shown in Figure 8, and the block or mold allowed to cool. Two such blocks 20, 20 are then put face-to-face, as shown in Figures 10 and 11, with an interposed plate 28. The margins of the strips 22, 22 are welded to the plate to form a liquid-tight closure. A pouring spot or sprue, such as 29 may then be welded to the opening left by the corresponding notches 25, 25 and molten facing metal poured through the spout 29 into the spaces left between the plate 28 and the bonding layers 26. The mold shown in Figures 10 and 11 may be preheated to a temperature below that at which the bonding metal will melt, if desired.

The blocks need not be preheated, since the molten cuprous alloy, such as silicon bronze, will readily weld to the surface of the bonding alloy. The bonding metal may be copper, or a nickel-copper alloy, or it may be an alloy of considerable copper-nickel content with a small amount of silicon, or any other alloy to which silicon-bronze or other desired facing metal will readily bond. A suitable alloy comprises copper, 96 parts, silicon, 3 parts, and tin, or manganese, 1 part or less.

Figure 16:
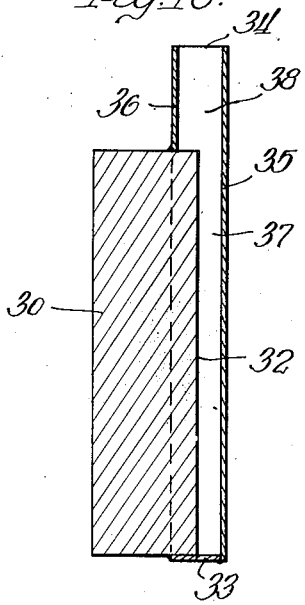
Figure 16 is a vertical sectional view taken on the line 16—16 of Figure 15.
Figure 15:
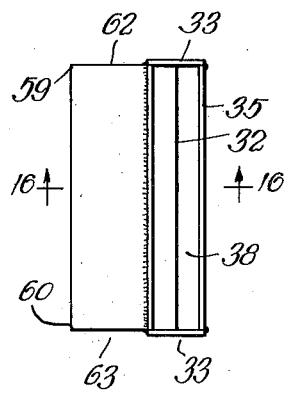
Figure 15 is a top plan view of a modified form of open mold for applying a facing of predetermined thickness.

It will be observed that in the method of pouring disclosed in connection with the embodiments of Figure 4 and Figure 10, the intermediate wall or plate 8 or 28, as the case may be, gives a definite thickness of the facing layer. The face of this layer is defined by the wall, and hence is protected from oxidation and resulting irregularities. The same principle may be applied to the fabrication of a single compound block, as illustrated in Figs. 15 to 18. In Figures 15 and 16 the slab or ingot 30 has the welding face 32 thereof suitably cleaned, as by sand blasting, and then fluxed, and a peripheral strip 33 on the sides and bottom is welded to the margins of the block or ingot 30. The strip is extended along the sides to a height indicated at 34 on each side for forming the sprue or pouring spout. A suitable plate 35 is welded to the margins of the strip 33, and a closure 36 on the back side of the strip 33 is welded to the margin of the strips and to the adjacent margin of the block 30 to form a sprue or pouring spout. The space 37 may be filled with flux and the mould thus formed preheated and molten metal poured into the sprue 38 to fill the space 37 and to displace the molten flux. Alternatively, the sprue may be large enough that a charge of facing alloy and flux in solid form may be introduced into the space and the mould with the charge of flux and facing metal brought to a temperature which will melt the facing metal and bring the block 30 and the metal to the welding temperature.

If it is desired to interpose an intermediate bonding layer such as 26, as shown in Figure 17, for the production of a single compound block or ingot, the block or ingot is first provided with the peripheral strip 22, as indicated in Figure 7, and is then preheated, as explained in connection with Figures 7, 8 and 9, to weld the layer of bonding metal 26 to the face of the block 20. A plate 35 is then welded to the peripheral strip 22, and a sprue or pouring spout 39 welded to the strip 22, the front plate 35, and to the top of the block 20. Then the deposit and welding of the facing layer may proceed as described in connection with Figures 10 and 11, with or without preheating of the mould in advance of pouring the molten facing metal into the space 40. Where the bonding metal, such as 26, is subject to atmospheric attack, as for example, if it is pure copper or copper and nickel, the flux, instead of being scraped off, may be allowed to solidify in place and it will be melted off and displaced by pouring in the charge of facing metal. Obviously, the space 40 may be filled with flux, if desired. Where the flux is allowed to remain on the block 26, the mould may be preheated to a temperature which will melt the flux. This flux does not run off completely, as it is sticky and viscous, even at relatively high temperatures. Glass may be employed as a fluxing material instead of borax and boric acid. Any known or suitable flux may be employed.

The introduction of the facing metal into the space between the welding face and the plate, such as 8, 28 or 35, may be performed by introduction of the metal from the bottom in order to float the flux more readily to the top. Thus, in Figures 12 and 13, the pouring sprue, instead of being formed at the top, may be provided as a separate passageway at the side, as shown in Figures 12 and 13. The blocks 1 and 2 are assembled in the manner shown in Figures 5 or 6 with steel strips 42, 42 between the sides of the steel strips 43 at the bottom. An opening is provided at 44 to put the pouring passageway 45 into communication with the spaces between the plate 8 and the two welding faces as indicated at 44 in Figures 12 and 13. The passageway 45 forms a sprue for pouring the metal into the two mould spaces. The spaces between the blocks and the central plate 8 at the top may be left open or short strips, such as 46, 46 may extend part way across the space, in order to center the plate 8 more securely. The strips 42, 42 may extend above the blocks to form a chamber 47 above the plate 8 in order to insure that the molten metal will completely fill the mould spaces. The space 47 thus serves as a riser or secondary sprue. The mould may be preheated to melt the flux which is contained in the mould spaces, and then the molten facing metal is poured into the space and welded to the slabs 1 and 2. After solidification, the compound double slab may be rolled as desired.

The mould need not be set on end. It may, for example, be laid on its side, as indicated in Figure 14. The pouring sprue 45 communicates with the space between the welding surfaces and the defining wall, whether that be merely a containing wall, as shown in Figures 16 and 17, or whether it be a block or slab with a welding face to be joined, as disclosed in my copending application, Serial No. 142,387, filed May 13, 1937. The opening 44 at the bottom of the sprue 45 allows bottom pouring into the mould space 48, and the discharge of the flux at the riser 49. The mould is preferably set on an inclined support 50 to insure that the riser 49 will communicate with the highest point in the space 48, which is to be filled with the facing metal or bonding metal, as the case may be.

Where it is desired to apply a coating to more than one face of the slab or ingot, the mould may be extended to the desired degree about the periphery of the ingot or slab. Thus, for example, in Figures 15 and 16, the space 38, instead of covering only one lateral face, such as 32, may be extended so as to include the adjacent faces 62 and 63 by carrying the strips 33 back even with the corners 59 and 60 and providing suitable plates for closing the extended mould space 38.

If it be desired to coat or face all four lateral sides of the ingot or slab, then the plates defining the mould space forms a closed tubular member joined to the bottom of the ingot or slab. Thus, for example, in Figure 18, the round ingot or slab 64 is surrounded by a conical tubular shell 65 which may be made up of one or more plates welded together. Obviously, the cross-section of the block 64 may be circular or polygonal, as desired. A closure plate 66 is welded at 67 to the lower end of the tubular shell 65 and at 68 to the end surface of the ingot 64. The surface of the ingot 64 which it is desired to cover with the facing metal is first sand blasted and may be covered with flux baked thereupon before the application of the shell 65. In the case of the facing metal which readily bonds to the surface of block 64, the mould formed by the ingot and shell need not be preheated, or may be preheated to only a low degree. If desired, alternatively, the shell 65, including the annular space 69, may be filled with a charge of bonding metal and flux and melted in place to produce the bond. Where the bonding metal requires a substantial period of time to produce the weld to the face of the ingot 64, the mould of Figure 18 may be filled with flux preheated to the required degree and the molten facing metal poured into the space 69 to displace the flux and produce the bond.

I have shown a conical sleeve 65 to facilitate the removal of the composite ingot from the mould upon solidification by cutting the annular plate 66 as with a torch and forcing the faced ingot out of the sleeve 65. It is contemplated that a cylindrical sleeve 65 may be employed instead of the conical sleeve shown. Upon cooling, sufficient shrinkage of the alloy tends to occur to provide a clearance which permits the removal of the sleeve 65 by cutting the same lengthwise or otherwise to secure removal of the sleeve. The bonding metal preferably should not be extended beyond the line 70, that is, the end of the upper level of the ingot 64, but the space in the upper end of the sleeve 65 allows for rising of flux and the flotation of impurities to the top of the metal, which may then be removed, as by trimming off. An ingot having a circular cross section, is desirable for the production of rods, wires, and the like, consisting of a steel core and a covering layer of copper-silicon bronze, or copper-silicon-nickel bronze, or the like. Where products of non-circular shape, for example, I-beams, angle bars, T-bars, and the like, having their lateral surfaces coated with a cuprous metal, are to be produced, the block 64 and the surrounding sleeve 65 may be of rectangular cross section, either square or oblong. The copper clad rectangular ingot may then be rolled into the desired structural shape.

The compound ingots or slabs are subjected to rolling according to steel mill practice, i. e., heavy rolling or working.

In the various forms herein shown, the mould is so disposed that the vertical dimension of the mould space exceeds the thickness of the layer to be applied. In other words, instead of an open faced mould, except for the initial step shown in Figure 7, the moulds herein shown are substantially closed moulds. That is to say, the facing layer is cast edgewise, which protects the final exposed face, and allows the impurities to be taken off at one edge.

I do not intend to be limited to the specific details herein illustrated and described, except as they are included in the following claims. Modifications and departures in detail will at once appear to those skilled in the art, and all these, so far as they are the equivalents of what I have taught, or merely improvements thereupon, I intend to include within the appended claims.

I claim:

1. Method of producing a double thickness copper clad slab suitable for rolling with the cuprous metal coatings facing toward each other, which comprises disposing two steel slabs in predetermined spaced relation with their welding surfaces facing each other, disposing a separating plate in the space between said faces, closing off the bottom and sides of said space, and pouring molten facing metal in said space on each side of said separating plate.

2. Method of claim 1 characterized by welding a strip of metal to the margins of said slabs at the bottom and two sides to close off the said space and to join said slabs mechanically.

3. Method of claim 1 characterized by filling said space with flux and preheating said slabs to melt the flux, pouring of the molten facing metal into the space displacing said flux.

4. Method of producing a double thickness copper clad slab assembly for rolling, which comprises disposing two metal slabs with their welding surfaces facing each other in vertical position, welding a steel strip to the bottom and side margins of said metal slabs, disposing a wall in fixed position in said space between said welding surfaces, disposing a sprue holder in liquid-tight communication with said space on each side of the wall, and pouring molten facing metal into said space to fill said space and said sprue holder.

5. Method of claim 4 characterized by providing a filling of flux in said space and in said sprue holder and preheating the metal slabs prior to pouring of the molten facing metal.

6. Method of facing a steel slab with a coating of cuprous alloy, which comprises welding a thin steel wall peripherally about three sides of a vertical face which is to be covered, welding a steel plate to said thin steel wall, thereby defining a vertical mould open at the top comprising a liquid containing space having a thickness corresponding to the desired thickness of the coating, covering said face to be coated with flux, preheating the mould, and pouring molten facing metal into the mould at the open top to produce a coating bonded to the face of said slab.

7. Method of facing the vertical surface of a metal block with a cuprous facing alloy, which comprises welding a thin steel shell to the block to form therewith an open top vertical mould having a vertical liquid space of a thickness corresponding to the desired thickness of the coating, disposing in vertical mould a charge of facing metal sufficient to coat the vertical face of the block to the desired depth and thickness, sealing said charge of metal with a flux, and heating the vertical mould to melt the flux and the charge of facing metal, said molten facing metal displacing the molten flux and bonding to the surface of the block.

8. Method of facing a steel slab with a coating of cuprous alloy, which comprises welding a thin steel wall peripherally about three sides of the face to be covered, welding a thin steel plate across the open end of said wall, thereby defining a mould with a liquid containing space of a thickness corresponding to that desired for the coating, covering said face to be coated with flux, preheating the mould, and pouring molten facing metal into the mould to produce a coating bonded to the face of said slab.

9. Method of facing the lateral surface of a metal block with a cuprous facing alloy, which comprises welding a thin steel shell comprising three side members and a member closing the open end thereof to the block to form therewith an open top mould having a liquid space of a thickness corresponding to that desired for the coating, disposing in said mould a charge of facing metal sufficient to coat the face of the block to the desired depth and thickness, sealing said charge of metal with a flux, and heating the mould to melt the flux and the charge of facing metal, said molten facing metal displacing the molten flux and bonding to the surface of the block.

10. Method of producing a pair of composite metal slabs which comprises disposing two metal backing slabs in predetermined spaced relation with their welding surfaces facing each other, closing off the bottom and sides of the space between said surfaces and separating the space into two mould spaces, and casting facing metal into said two mould spaces.

11. Method of producing a pair of composite metal slabs which comprises disposing two metal slabs in predetermined spaced relation with their welding surfaces facing each other, closing off the bottom and sides of the space between said surfaces and separating the space into two mould spaces, coating said welding surfaces with a flux, preheating said metal backing slabs, and pouring molten facing metal into said mould spaces.

12. Method of facing a steel slab with a coating of cladding metal, which comprises welding a thin steel wall peripherally about three sides of a vertical face of the slab, welding a steel plate to said thin steel wall to define with the same and said vertical face a vertical mould space open at the top and having a thickness corresponding to the desired thickness of the coating and flowing the cladding metal onto said vertical face in said vertical mould space.

13. Method of making a vertical mould on a steel slab for receiving therein metal for cladding a vertical face of the same, which comprises welding a thin steel wall peripherally about three sides of a vertical face of the slab, and welding a steel plate to said thin steel wall to define with the same and said vertical face a vertical mould space open at the top and having a thickness corresponding to the desired thickness of the cladding metal.

THOMAS B. CHACE.